United States Patent Office 3,431,593
Patented Mar. 11, 1969

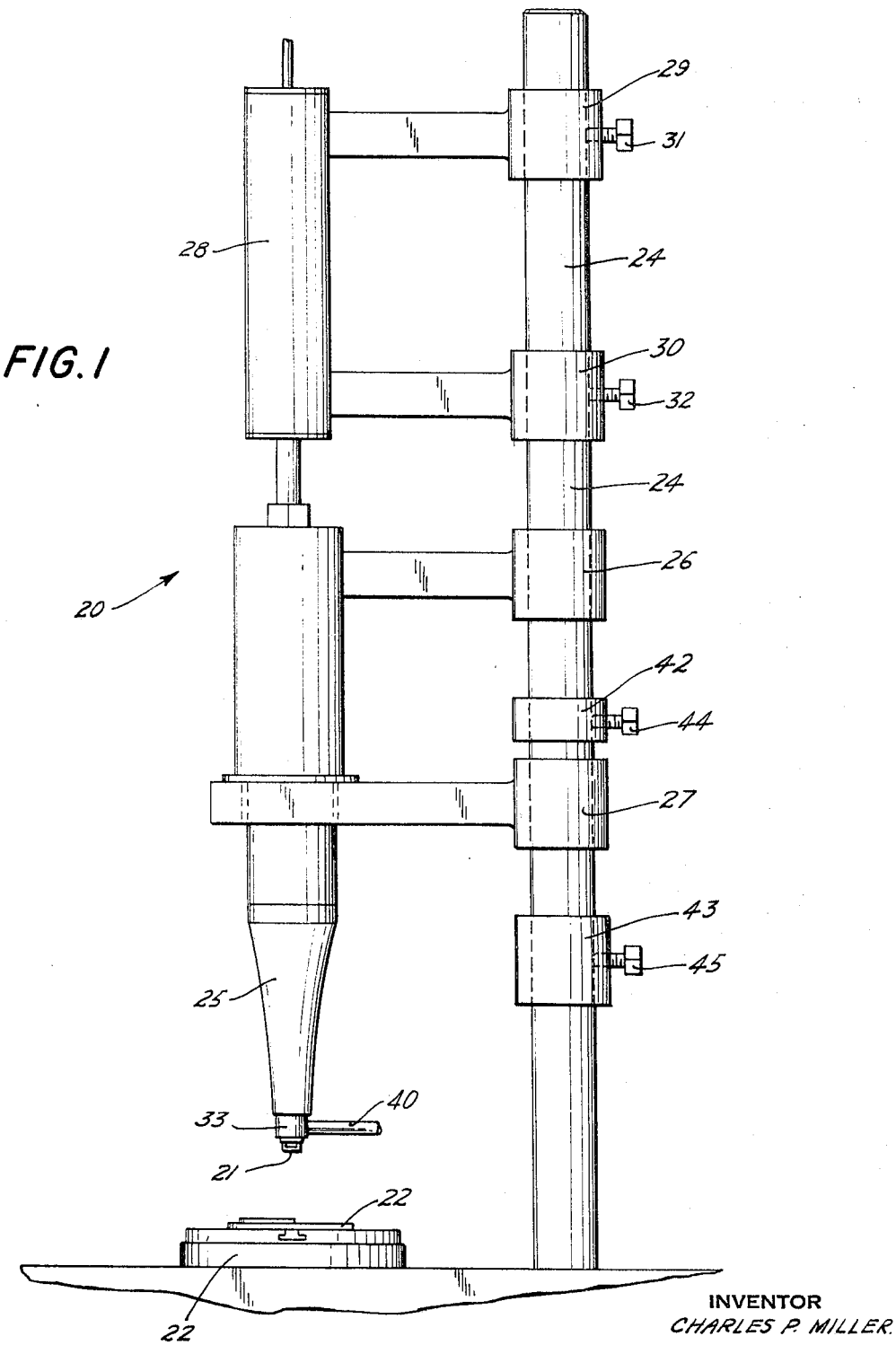

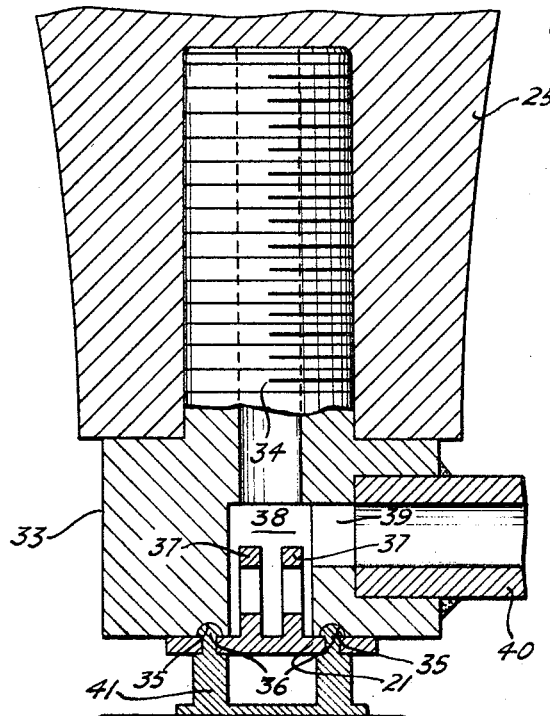
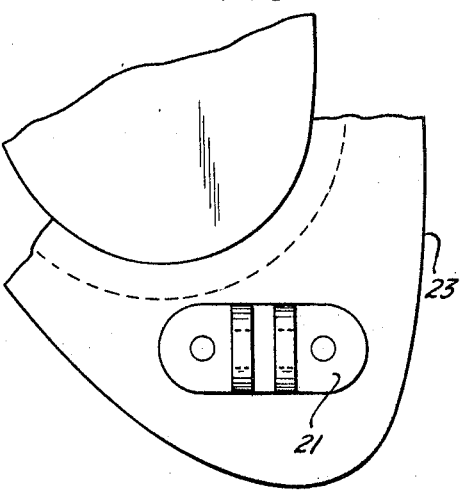
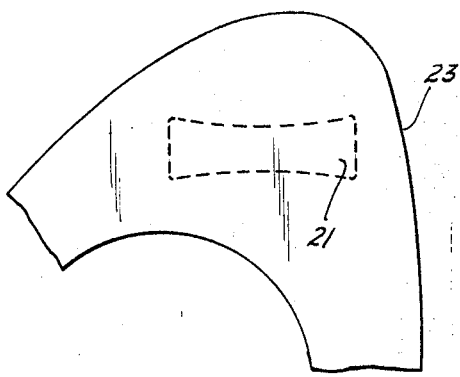
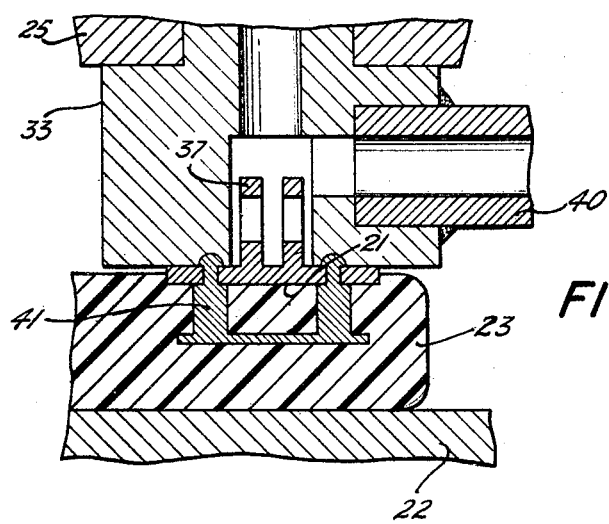

3,431,593
ULTRASONIC HINGE SINKING APPARATUS
Charles P. Miller, Providence, R.I., assignor to
Univis, Inc., a corporation of Ohio
Filed Dec. 29, 1966, Ser. No. 605,781
U.S. Cl. 18—1
Int. Cl. B25b 11/00
12 Claims

ABSTRACT OF THE DISCLOSURE

Apparatus for ultrasonically sinking metal hinges into a plastic frame. A supporting structure is provided which has an ultrasonic vibrating horn movably mounted thereon. Vibrating means are connected to the horn for vibrating the horn and means are provided to move the vibrating horn with respect to the supporting structure. A tip is mounted on the horn so as to substantially synchronously vibrate with the horn and has an opening therethrough to receive a hinge to be sunk. There are means in the tip to prevent the hinge mounted theron from twisting during vibration to thereby prevent parts of the hinge to shear from contact with the tip. Also, means are provided to mount a frame to receive a hinge when the hinge is moved with the horn into contact therewith so that the ultrasonic substantially synchronous vibration of the hinge, horn and tip causes the portion of the frame adjacent to the hinge to reach its melting point, thereby allowing the hinge to be sunk within the frame.

---

This invention relates to an apparatus for ultrasonically sinking hinges in an eyeglass frame or similar article while minimizing danger of crystallization of the metal hinge.

In the manufacture of plastic spectacle frames, it is common practice to apply hinges to an eyeglass frame by riveting the hinge to the frame. This process is not only time consuming and relatively expensive, but creates a number of additional drawbacks particularly the inherent cosmetic effects. This leads to an unsightly projection of the rivet heads in the outer side of the frame thereby lessening the aesthetic value of the frames.

A resistance welding technique may be employed to sink the hinges. In this method, the hinge is used as a heating element to heat the frame to its melting point and allow penetration of the hinge to the desired depth. However, this method is unsatisfactory in that it takes too long a period of time to sink a hinge, normally as long as 5 or 6 seconds. This length of time permits the plasticizer in the frame to evacuate with resultant brittleness of the frame occurring.

Therefore, it would be advantageous in the art of manufacturing eyeglass frames to have hinges which are sunk into the plastic eyeglass frame and which do not in any way extend through to the outer side and be exposed to thereby mar the desired physical appearance and the cosmetic value of the frame and at the same time not detrimentally affect the desired physical properties of hinge or frame.

In accordance with the present invention, a method of sinking these hinges by ultrasonic vibration into the frame to a preferred depth is provided which alleviates these prior art problems.

However, several problems must be taken into consideration when ultrasonic hinge sinking is used. There is also danger of crystallization of the metal hinge due to the excessive length of time the hinge must be ultrasonically vibrated before it has been sunk to the correct depth. The high speed vibrations of ultrasonic equipment could also cause the metal hinges to crystallize before the sinking process is finished. Therefore, an apparatus is desirable which will quickly and accurately sink the hinges before the metal has had time to crystallize due to the ultrasonic vibration. Another problem with ultrasonic sinking equipment is that the high vibrations often cause parts of the metal hinges to be sheared off if they are not held tightly and properly in position. Accordingly, the present invention provides an apparatus which will positively hold the hinges to be sunk in a rigid and stable position during the sinking process while it is being vibrated to the required depth in a minimum amount of time.

It is therefore an object of this invention to provide an ultrasonic hinge sinking apparatus which will alleviate the above mentioned problems and still provide the above mentioned advantages.

With this and other objects in mind, reference is had to the drawings, in which:

FIG. 1 is a side elevation view of a hinge sinking apparatus embodying this invention;

FIG. 2 is a fragmentary sectional elevation view thereof showing a hinge in position for sinking;

FIG. 3 is a fragmentary sectional elevation view thereof showing a hinge immediately after sinking;

FIG. 4 is a fragmentary top view of an eyeglass frame with a hinge having been sunk in it;

FIG. 5 is a fragmentary view of the front of an eyeglass frame with a hinge having been sunk in it.

For illustrative purposes, the ultrasonic hinge sinking apparatus in this disclosure will be used to sink a metal hinge into a plastic eyeglass frame. Although a number of commercially available resins may be employed for the frame, the present invention contemplates utilizing resins commonly employed for such purposes such as cellulose acetate. Ultrasonic hinge sinking utilizes the conversion of high frequency vibrations to transmit and generate kinetic energy. In the FIGURE 1 an ultrasonic hinge sinking apparatus 20 embodying this invention is shown with a hinge 21 in position for sinking. A work table 22 having a frame 23 fixed thereon is positioned below the apparatus 20 so that when the apparatus is operated, hinge 21 will be sunk within frame 23.

The hinge sinking apparatus is provided with a vertical support pole 24 for mounting parts of the apparatus. In this connection a vibrating member or horn 25 is slidably mounted on support pole 24 by means of guide arm 26 and loading arm 27. To prevent horn 25 from freely falling in a vertical direction it is connected at the top to an air cylinder 28. Air cylinder 28 is fixed in position by support brackets 29 and 30 which are fixed to support pole 24 by means of set screws 31 and 32. Therefore, the vertical movement of vibrating horn 25 is limited by the pneumatic pressure of air cylinder 28.

A tip 33, into which hinge 21 is placed, is mounted on the lower end of horn 25. As seen in FIGURE 2, tip 33 has a threaded upper extension 34 which engages with the threaded bore of horn 25. The lower end of tip 33 has two cavities 35 which correspond in size to rivet heads 36 on the head of a standard and well known eyeglass frame hinge. By placing rivet heads 36 into cavities 35, twisting of the hinge during vibration is prevented thereby alleviating the danger of shearing off of ears 37 of the hinge. A vertical bore 38 in tip 33 into which ears 37 extend communicates with a horizontal bore 39. A vacuum tube 40 is connected to horizontal bore 39 in a convenient manner, such as by welding, so that it is in sealed engagement. The resultant vacuum created permits atmospheric pressure to maintain hinge 21 within tip 33. For proper results, including the proper transfer of vibration from the horn to the tip and then to the hinge, the material used for the tip is a material having a high nickel content which has a high modulus of elasticity even after hardening.

The tip is face-hardened to increase the density both for withstanding the impact, and also for improved frequency activity curve characteristics. Without a tip of this nature the time required to sink a hinge in the plastic would be extended, thus setting up the possibility of crystallizing the hinge due to a long period of ultrasonic exposure. A tip of hy-ten N-Temper high nickel alloy steel having a Rockwell face hardness of 60 to 63 on the C scale, such as manufactured by the Wheelock, Lovejoy & Co., Inc., has been found to be adequate for use with this apparatus. Adequate, but less satisfactory results may be obtained with a tip made of titanium or cold rolled steel, as well as other materials.

As stated previously, the tip 33 is provided with two small cavities 35 which align hinge 21. This serves to accurately locate the hinge in its plastic component, and to prevent twisting. If twisting were allowed to take place the hinge ears 37 would come in contact with vibrating tip 33. As the ears are a projection of small cross sectional area the vibration would set up an oscillating bending moment bringing them to a crystallized state of shear, or pure crystallization which causes shear under low stress. Thus, locating cavities 35 force the vibration to be transmitted directly to the anchoring portion 41 of hinge 21 which imposes kinetic generation rather than approaching a shearing stress. If, however, the time function is too high even with a tip of this type it could crystallize anchoring portion 41 of hinge 21, but not the ears 37. Thus the anchoring portion is so designed to achieve maximum tensile strength in a minimum of sunken depth.

Another important factor is the mass of tip 33, which must be so designed as to complete a full wave section when compared to the horn design and the exciting component. The exciting component generates a half wave section, whereas the horn and its tip generates a full wave section which, of course, is a two to one ratio, thus setting up a vibratory increase. The amplitude of this increase is controlled by horn design, mass and frequency. A horn which moves vertically down during the sinking process will produce the proper wave form. There is no set mass for this tip, but its mass must be compatible with its operating circuit of which there are many designs, depending on the manufacture of the ultrasonic equipment. Common commercial type of ultrasonic equipment may be used, for instance, ultrasonic equipment manufactured by Branson Instruments, Inc., in Danbury, Conn., has been found to work satisfactorily.

Means are provided for limiting the vertical displacement of horn 25. Adjustable stop 42 limits the movement of horn 25 in the upward direction and limit stop 43 limits the displacement of horn 25 in the downward direction. Adjustable stop 42 and limit stop 43 are fixed to support pole 24 by means of set screws 44 and 45 respectively. Thus, the vertical displacement of horn 25 may be regulated. In this way, the depth to which hinge 21 is sunk into frame 23 can be closely controlled.

In the operation of the apparatus, hinge 21 is loaded into tip 33 and is maintained in position by atmospheric pressure due to the vacuum created within tip 33 by vacuum tube 40. Horn 25 is then moved downward, powered by air cylinder 28. At a point .010–.020 of an inch before making contact with the plastic frame 23, the exciting circuit of horn 25 is activated which starts the ultrasonic vibrations. For the best results, at the point of activation, horn 25 vibrates at 20–30,000 c.p.s. Hinge 25 which is connected to horn 25 and is vibrating at the same frequency makes contact with plastic frame 23. At this point kinetic energy is generated between the interfaces of plastic frame 23 and metal hinge 21 raising the temperature to the flow state of the plastic frame 23. Since hinge 21 is under force it will extrude the molten plastic around the anchoring portion of hinge 21 as it penetrates plastic frame 23. The shape of anchoring portion 41 of hinge 21 helps the molten plastic to flow around it and consequently makes it easier for hinge 21 to enter frame 23. The depth to which hinge 21 is sunk is a function of time versus frequency. The higher the frequency the faster the kinetic transfer will take place, the longer the time dwell the deeper hinge 21 will sink. The normal cycle time for impregnating a hinge into plastic is from .4–.6 seconds. This time is also a function of frequency and the degree of impurities in the plastic. A .6–.8 second dwell period is then provided to allow the plastic to cool and set in its new position. By using this apparatus, as many as 600–1200 hinges may be sunk per hour. The position of hinge 21 after it has been sunk can best be seen in FIGURE 3. In FIGURE 4 and FIGURE 5 respectively the appearance of eyeglass frame 23 in back and in front with a hinge in place is shown.

The hinges may be fed into the tip automatically or by hand. Two machines may be used, a left hand machine and a right hand machine each to place a hinge on each side of an eyeglass frame.

Thus, this invention contemplates an ultrasonic hinge sinking apparatus having a vibrating horn movably mounted on a supporting structure, means to vibrate the horn, means to move the horn with respect to the supporting structure, an improved tip mounted on the horn which will synchronously vibrate with the horn and having means thereon to receive a hinge so that the hinge will synchronously vibrate with the tip and the horn at a speed rapid enough to quickly sink the hinge into a frame without danger of crystallization of the hinge or of shearing off of parts of the hinge.

Thus the aforementioned objects and advantages are most effectively attained. Although several preferred embodiments of this invention have been disclosed in detail herein, it should be understood that this invention is in no sense limited thereby; and its scope is to be determined by the appended claims.

I claim:

1. An apparatus for ultrasonically sinking metal hinges into a plastic frame which comprises:

a supporting structure having an ultrasonic vibrating horn movably mounted thereon;

vibrating means connected to said horn for vibrating said horn;

means to move said vibrating horn in respect to said supporting structure;

a tip mounted on said horn so as to substantially synchronously vibrate with said horn and having an opening therethrough to receive a hinge to be sunk;

means in said tip to prevent said hinge mounted thereon from twisting during vibration to thereby prevent parts of said hinge to shear from contact with said tip;

said means for preventing said hinge from twisting includes recesses on the surface of said tip and positioned with respect to said opening so as to receive portions of said hinge when said hinge is received within said opening; and means to mount a frame to receive said hinge when said hinge is moved with said horn into contact therewith so that the ultrasonic substantially synchronous vibration of said hinge, horn and tip causes the portion of said frame adjacent said hinge to reach its melting point, thereby allowing said hinge to be sunk within said frame.

2. The invention in accordance with claim 1 wherein said vibrating horn is mounted on said supporting structure so that it may be moved in a substantially vertical direction and is conical in shape with a lower narrower hinge having said tip mounted therein.

3. The invention in accordance with claim 1 wherein limit means are provided on said supporting structure to predetermine the distance that the vibrating horn may be moved with respect to said supporting structure and, consequently, the distance that the hinge may be sunk into said frame.

4. The invention in accordance with claim 1 wherein a vacuum tube is connected to the opening in said tip at a point other than where said hinge is received so as to secure said hinge within said tip due to the presence of a vacuum within said tip.

5. The invention in accordance with claim 1 wherein said tip is comprised of a material having a relatively hard outer surface and a relatively high modulus of elasticity.

6. The invention in accordance with claim 1 wherein automatic timing means are provided to control the length of the sinking cycle, thereby providing a substantially accurate control over the depth to which the hinges are sunk within the frame.

7. A supersonic vibrator having a vibrating horn portion and a tip therefor mounted on the vibrating horn portion of said vibrator so that said tip is vibrated by said horn, comprising:

said tip having a body portion having an opening therethrough to receive a portion of said hinge to be sunk;
means on said tip for holding said hinge in a fixed position to prevent said hinge from twisting during vibration and shearing off portions thereof; and
said means for preventing said hinge from twisting including recesses on the surface of said tip and positioned with respect to said opening so as to receive portions of said hinge when said hinge is received within said opening.

8. The invention in accordance with claim 7 wherein a vacuum tube is connected to the opening in said tip at a point other than where said hinge is received so as to secure said hinge within said tip due to the presence of a vacuum within said tip.

9. The invention in accordance with claim 7 wherein said tip is comprised of a material having a relatively hard outer surface and a relatively high modulus of elasticity.

10. An apparatus for ultrasonically sinking hinges into a frame which comprises:

a supporting structure having an ultrasonic vibrating horn movably mounted thereon;
vibrating means connected to said horn for vibrating said horn;
means to move said vibrating horn in respect to said supporting structure into contact with said frame;
a tip mounted on said horn so as to synchronously vibrate with said horn and having means thereon to receive a hinge to be sunk;
said tip being of a material so that it will transmit vibrations from said horn to said hinge to rapidly sink said hinge into said frame without danger of crystallization of said hinge;
means in said tip to prevent said hinge mounted thereon from twisting during vibration to thereby cause parts of said hinge to shear from contact with said tip; and
said means for preventing said hinge from twisting including recesses on the surface of said tip and positioned with respect to said means thereon to receive a hinge to be sunk so as to receive portions of said hinge when said hinge is received by said tip.

11. An apparatus for ultrasonically sinking metal hinges into a plastic frame which comprises:

a supporting structure having an ultrasonic vibrating horn movably mounted thereon;
vibrating means connected to said horn for vibrating said horn;
means to move said vibrating horn in respect to said supporting structure;
a tip mounted on said horn so as to substantially synchronously vibrate with said horn and having an opening therethrough to receive a hinge to be sunk;
means on said tip to prevent said hinge mounted thereon from twisting during vibration to thereby prevent parts of said hinge to shear from contact with said tip;
said means for preventing said hinge from twisting including two small cavities on one surface of said tip and positioned with respect to said opening so as to receive two rivet heads on the hinge when a portion of said hinge is received within said opening, said rivet heads being of approximately equal size to said cavities, thereby preventing said hinge from twisting due to vibrations with resultant shearing off parts of said hinge; and
means to mount a frame to receive said hinge when said hinge is moved with said horn into contact therewith so that the ultrasonic substantially synchronous vibration of said hinge, horn and tip causes a portion of said frame adjacent said hinge to reach its melting point, thereby allowing said hinge to be sunk within said frame.

12. A supersonic vibrator having a horn portion and a tip therefor to be mounted on the vibrating horn portion of said vibrator so that said tip is vibrated by said horn comprising:

said tip having a body portion having an opening therethrough to receive a portion of said hinge to be sunk;
means on said tip for holding said hinge in a fixed position to prevent said hinge from twisting during vibration and shearing off portions thereof;
said holding means including two small cavities on one surface of said tip, said cavities being positioned with respect to said opening so as to receive two rivet heads on the hinge when a portion of said hinge is received within said opening, said rivet heads being of approximately equal size to said cavities, thereby preventing said hinge from twisting due to vibrations and shearing off parts of said hinge.

References Cited

UNITED STATES PATENTS

| | | | |
|---|---|---|---|
| 1,366,674 | 1/1921 | Matthews | 18—1 |
| 1,428,185 | 9/1922 | Reed | 18—1 |
| 1,447,059 | 2/1923 | Benson | 18—1 |
| 3,184,353 | 5/1965 | Balamuth et al. | 29—432 X |
| 3,222,767 | 12/1965 | Ashurkoff et al. | |
| 3,224,086 | 12/1965 | Balamuth | 29—525 |
| 3,245,138 | 4/1966 | De Wilde | 29—525 |

WILLIAM J. STEPHENSON, Primary Examiner.

U.S. Cl. X.R.

29—525; 264—23